(12) United States Patent
Tiernan (10) Patent No.: US 6,869,629 B2
(45) Date of Patent: Mar. 22, 2005

(54) DRIP PAN FOR AN INFRARED COOKING APPARATUS AND METHOD THEREFOR

(76) Inventor: Michael George Tiernan, 7808 Lindsey, Amarillo, TX (US) 79121

( * ) Notice: Subject to any disclaimer, the term of this patent is extended or adjusted under 35 U.S.C. 154(b) by 300 days.

(21) Appl. No.: 10/132,860

(22) Filed: Apr. 25, 2002

(65) Prior Publication Data
US 2003/0200961 A1 Oct. 30, 2003

(51) Int. Cl.$^7$ .............................. A23L 1/01; A47J 37/04
(52) U.S. Cl. ........................... 426/243; 99/444; 99/446; 126/30; 126/39 C; 126/41 R; 426/523
(58) Field of Search ................................ 426/243, 523; 99/340, 400, 444, 446; 126/30, 39 C, 41 R (56) References Cited

U.S. PATENT DOCUMENTS

| | | | |
|---|---|---|---|
| 4,321,857 A | 3/1982 | Best | 99/340 |
| 4,886,044 A | 12/1989 | Best | 126/39 C |
| 5,639,497 A | * 6/1997 | Bedford et al. | 426/523 |

* cited by examiner

Primary Examiner—George C. Yeung
(74) Attorney, Agent, or Firm—Koestner Bertani, LLP (57) ABSTRACT

An apparatus, method and system is described for catching juices dripping from food being cooked in an infrared cooking apparatus, while still allowing infrared radiation to directly irradiate the food. A drip pan has base plate with an outer perimeter and an outer sidewall extending therefrom. The base plate has one or more apertures, each with an inner sidewall extending from its edges. The drip pan can hold a liquid, and the aperture and inner sidewall form a passage for infrared radiation through the liquid. The amount of drippings falling from the food being cooked through the passage may be reduced by covering the passage with a perforated cover, or by angling the inner sides defining the passage to overhang the aperture in the base plate. An adjustable solid cover may be mounted to the drip pan to allow the amount of infrared radiation reaching the food to be controlled.

15 Claims, 7 Drawing Sheets

DRIP PAN FOR AN INFRARED COOKING APPARATUS AND METHOD THEREFOR

BACKGROUND OF THE INVENTION

1. Field of the Invention

The invention relates to an infrared cooking apparatus and more particularly to drip pans for an infrared cooking apparatus.

2. Description of Related Art

An infrared cooking apparatus heats food by irradiating it with infrared radiation, rather than by convecting hot air around the food, as is done in a conventional oven. This direct heating sears the surface of the food, sealing more natural juices into the food. The absence of hot air convecting around the food also helps prevent the food from drying out while cooking. The infrared radiation is typically emitted by a refractory material, e.g. ceramic, that has been heated to incandescence. The refractory material may be heated by burning an air/gas mixture at the surface of the material as the mixture passes through holes formed in the material. Infrared emitters may be located below, above or to the side of the food being cooked in an infrared cooker. In infrared grills, which are one type of infrared cooker, the infrared emitter is typically below the food, which can be supported by a grill. Alternatively, the grill may be removed and a spit used to support food over the infrared emitter. In a rotisserie apparatus, the spit rotates along its long axis, rotating the food as it cooks.

As food is cooked, fats and other juices are released from the food. In infrared cookers having the infrared emitter located below the food, these drippings may fall onto the infrared emitter. A small amount of drippings may fall onto the infrared emitter and be vaporized, adding a desirable flavor to the food being cooked. However, a larger amount of drippings falling onto the infrared emitter may cause the juices to burn or flare up, rather than vaporize, adding an undesirable flavor to the food. Large amounts of drippings falling onto the infrared emitter can also clog the holes in the refractory material, or cause ceramic materials to become brittle. In some infrared grills, the grills supporting the food over the infrared emitter have been designed to channel away juices from the food and minimize the amount of drippings falling onto the infrared emitter. While this protects the emitter elements, it prevents the juice from cooking and adding desirable flavoring to the food.

Other attempts to catch drippings have included placing a solid drip pan between the food and the infrared emitter. Such drip pans are shallow and may contain a cooking liquid. This method allows the juices to be cooked individually by the emitter, but because such a drip pan covers the infrared emitter almost completely, it prevents food in a rotisserie apparatus from being cooked by direct infrared radiation thus negating the advantage of using the infrared emitter. Instead, the infrared radiation from the emitter is blocked by the drip pan and thus does not irradiate the food. As a result, the food on the spit is cooked by indirect, convected heat and by steam from the liquid in the drip pan.

As such, many typical drip pans for use in an infrared cooking apparatus suffer one or more shortcomings. Other problems and disadvantages of the prior art will become apparent to one skilled in the art after comparing such prior art with the present invention as described herein.

BRIEF SUMMARY OF THE INVENTION

The present invention provides a drip pan for use in an infrared cooking apparatus, which catches juices dripping from food being cooked while still allowing direct infrared radiation to irradiate the food.

Aspects of the invention are found in a drip pan for an infrared cooking apparatus, including a base plate with outer sidewalls extending upward from its outer edges. The base plate has one or more apertures in its interior with inner sidewalls extending upward from the edges of each aperture. The base plate and the inner and outer sidewalls form a pan that can hold a cooking liquid. The drip pan so formed allows infrared radiation to pass directly from the infrared emitter through the aperture in the base plate to the food being cooked.

Other aspects of the invention are found in a method for catching drippings from food in an infrared cooking apparatus. The method includes the steps of providing a drip pan with outer sides and one or more apertures in its bottom. Inner sides rising from the edges of each aperture enable the pan to hold a liquid. Further steps include placing the drip pan between the food and the infrared emitter of the cooking apparatus. Infrared radiation from the infrared emitter passes through the aperture in the bottom of the drip pan and through a passage in the liquid formed by the inner sides of the drip pan, to irradiate the food being cooked. A further step of the method is placing a liquid in the drip pan, to catch the drippings from the food being cooked.

Further aspects of the invention may be found in a system for cooking food, including an infrared cooking apparatus with an infrared emitter, and a food support apparatus. The system further includes a drip pan with a base plate, outer sides, one or more apertures in the interior of the base plate, and inner sides rising from the edges of each aperture. The drip pan can contain a liquid, and the aperture and the inner sides form a passage through the liquid to allow infrared radiation from the infrared emitter to irradiate the food on the food support apparatus.

As such, an apparatus, method and system for a drip pan for use in an infrared cooking apparatus are described. Other aspects, advantages and novel features of the present invention will become apparent from the detailed description of the preferred embodiments when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE PREFERRED EMBODIMENTS

Exemplary embodiments of the invention are illustrated in the Figures, like numerals being used to refer to like and corresponding parts of the various drawings.

Figure 1:
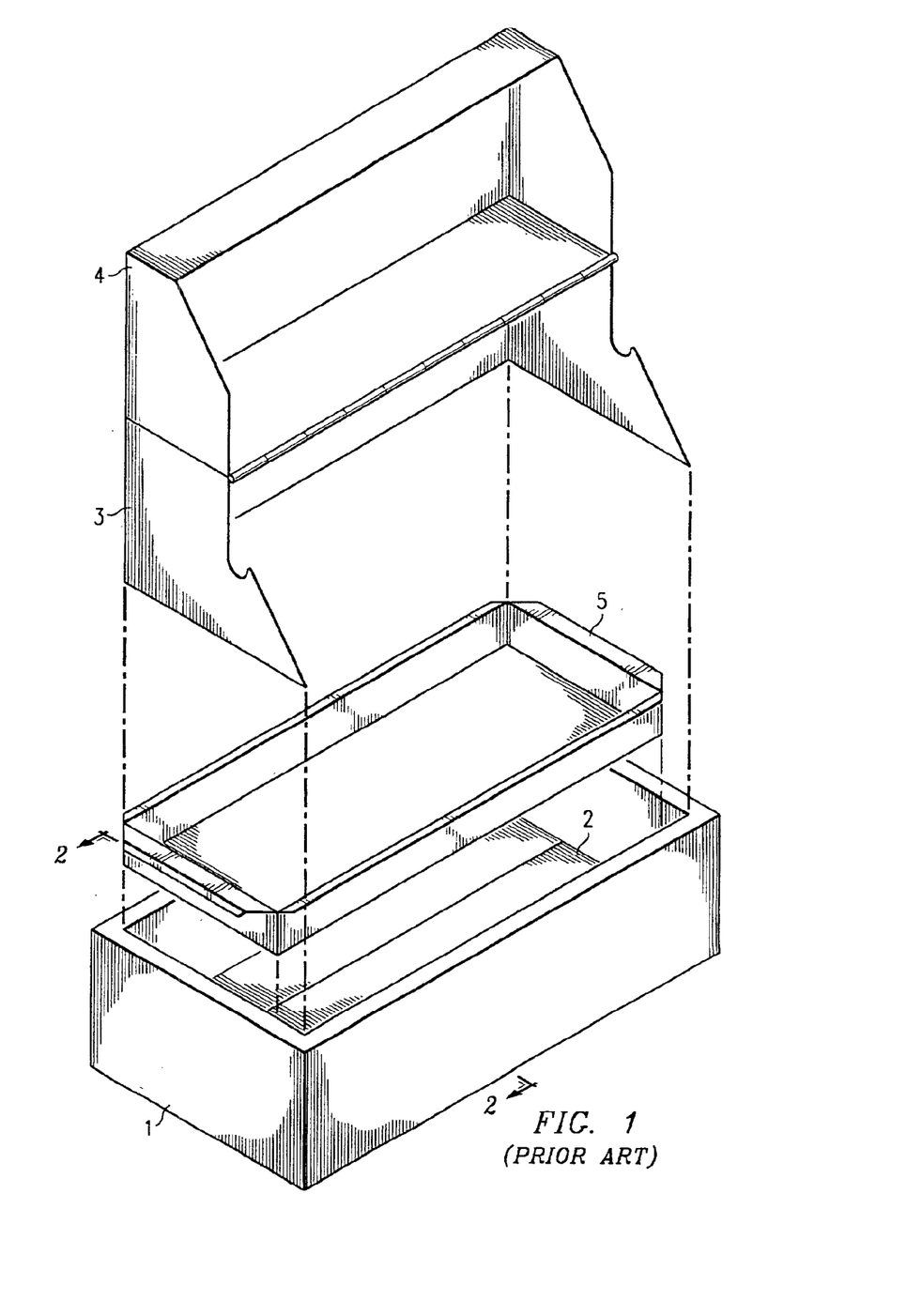
FIG. 1 is an oblique view of a drip pan associated with the prior art for an infrared cooking apparatus employing a conventional drip pan.

FIG. 1 depicts a drip pan associated with the prior art for an infrared cooking apparatus 10, having a box-like body 1 with an infrared emitter 2 located near the bottom of the body. An upper enclosure 3 with a lid 4 covers the opening at the top of the body 1. A conventional drip pan 5 hangs from the edges of the body opening. Drip pan 5 covers the majority of emitter 2 by extending from side to side across the opening, and extending much of the way from the front to the back of the opening.

Figure 2:
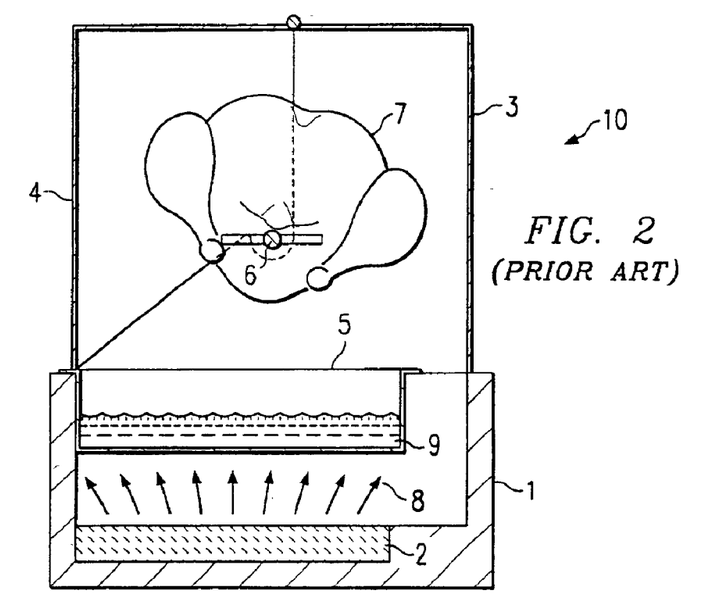
FIG. 2 is a cross sectional view of the prior art in FIG. 1 with food on a rotisserie.

FIG. 2 shows a cross-sectional view of the drip pan associated with the prior art. Upper enclosure 3 is shown in place atop the opening at the top of body 1, with its lid 4 closed. A spit 6 is laid across notches in the upper enclosure 3 and provides a cooking location by supporting food 7 to be cooked in a rotisserie manner. Prior Art drip pan 5 is hung across the opening at the top of body 1, and is interposed between the cooking location where the food 7 is placed and infrared emitter 2, and filled with cooking liquid 9 such as water. During normal operations, infrared emitter 2 emits infrared radiation 8, which is blocked by drip pan 5 from directly irradiating food 7 at the cooking location. Instead, the infrared radiation heats drip pan 5 and the walls of body 1, and hot air passes from below the drip pan around its back to heat food 7 by convection, rather than direct infrared radiation of the food.

The drip pan of the present invention, however, has one or more apertures in its base plate that allow infrared radiation from the infrared emitter to pass through the drip pan. This permits the radiation to directly irradiate the food being cooked, and reduces the heat load on the base plate of the drip pan. One embodiment of the present invention has inner sides around the aperture in the base plate that allow the drip pan to hold a cooking liquid. The cooking liquid prevents the pan from warping from the intense heat produced by the infrared emitter and prevents the drippings from flaring up. If a flavored cooking liquid is used, the steam can also add flavor to the food being cooked.

Figure 3:
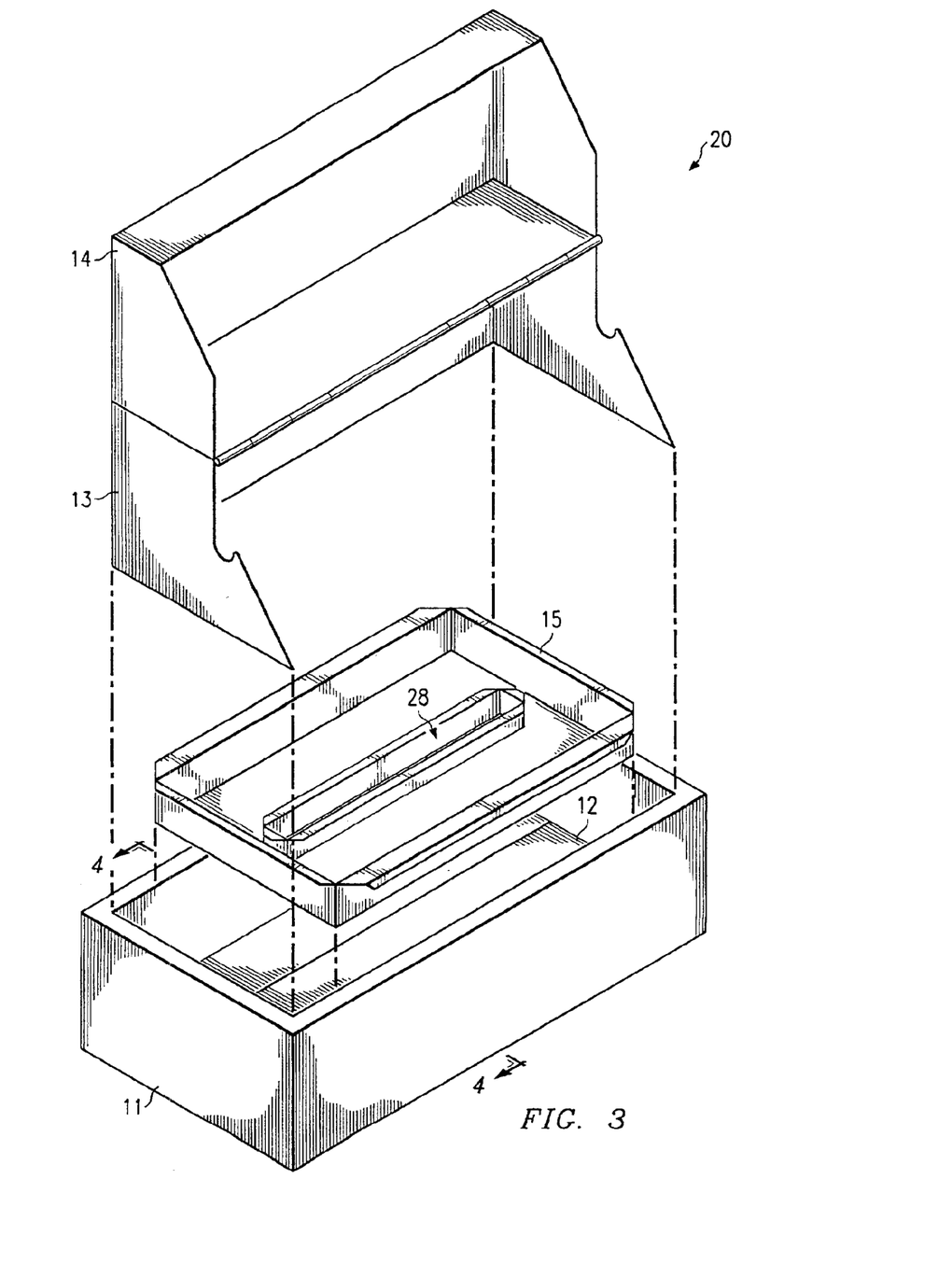
FIG. 3 is an oblique view of an infrared cooking apparatus employing a drip pan according to the present invention.

FIG. 3 depicts an infrared cooking apparatus 20 utilizing a drip pan embodying the present invention. Apparatus body 11, infrared emitter 12, upper enclosure 13, and lid 14 are like those described for FIG. 1. The drip pan 15, however, has a passage (also referred to herein as the aperture or tunnel) 28 that allows the infrared radiation to pass from the infrared emitter 12 to the food being cooked.

Figure 4:
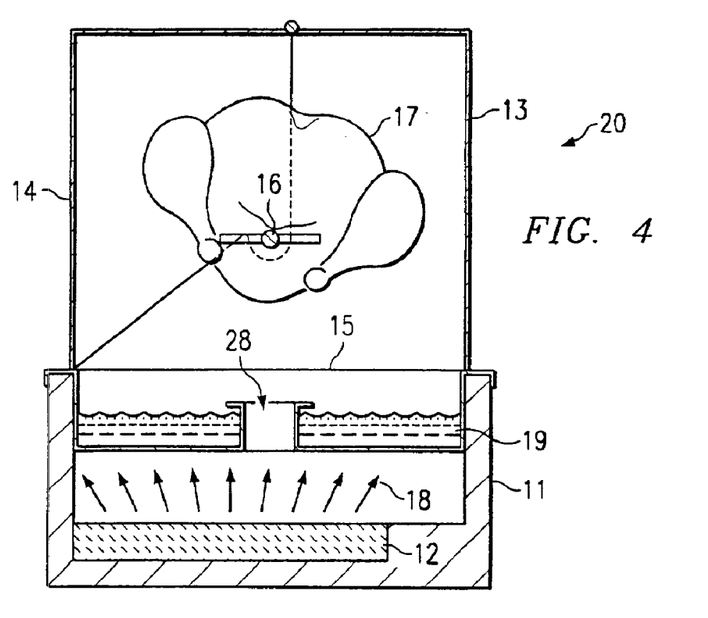
FIG. 4 is a cross sectional view of the apparatus in FIG. 3 in use as a rotisserie.

The embodiment of the present invention drip pan 15 can be seen in use in FIG. 4. Spit 16 has been laid across notches in upper enclosure 13 and closed lid 14, with food 17 mounted at the cooking location established by the spit. Drip pan 15 has been placed across the opening at the top of body 11, and is interposed between the cooking location where the food 17 is placed and infrared emitter 12, and holds cooking liquid 19. However, infrared radiation 18 from the infrared emitter 12 can pass through passage 28 and directly irradiate food 17.

While FIG. 4 shows food 17 supported by spit 16, a grill or hanging apparatus (not shown) might alternatively be used to support food 17. Drippings from food at the cooking location established by any of these means for supporting the food is caught by drip pan 15, rather than falling onto infrared emitter 12.

Figure 5:
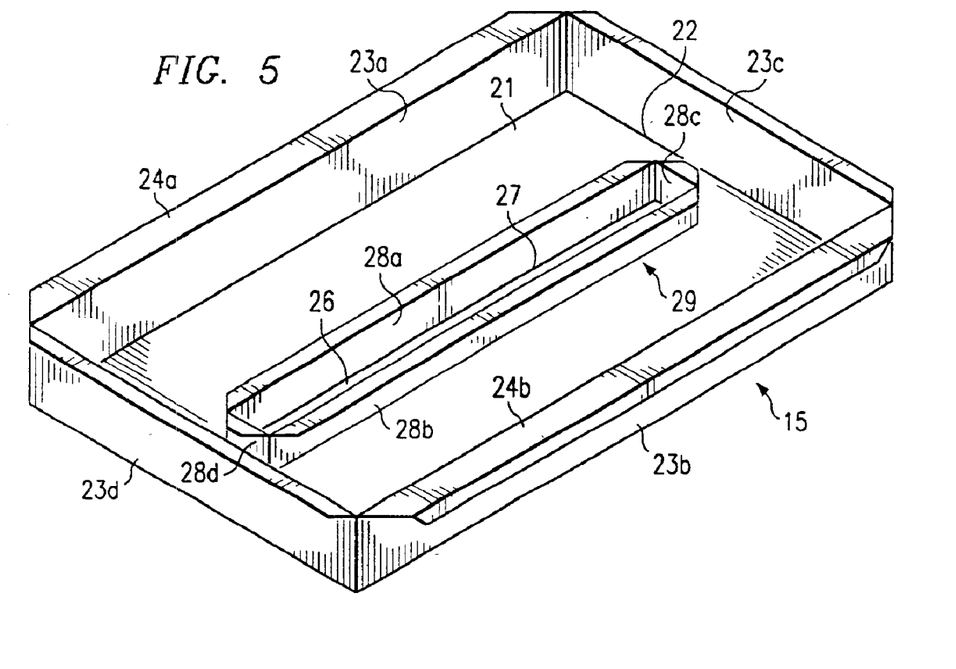
FIG. 5 is an oblique view of a drip pan according to the present invention.
Figure 6:
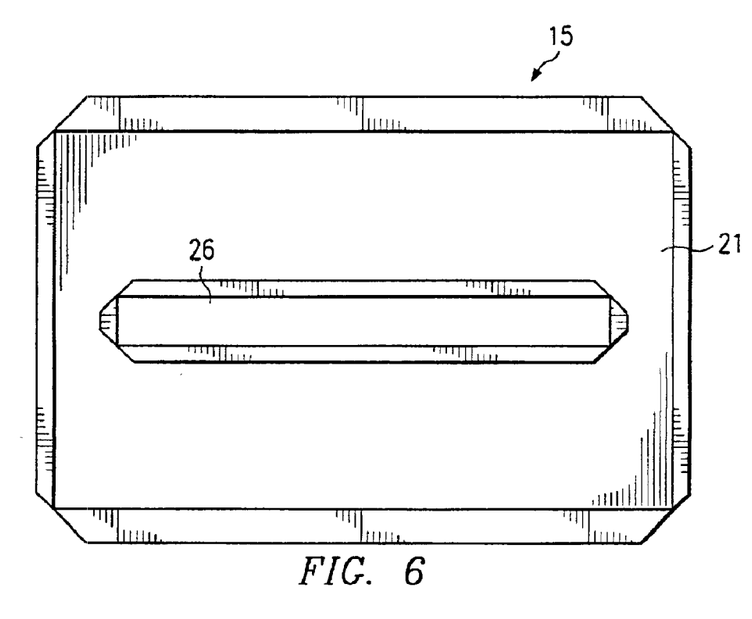
FIG. 6 is a top view of the drip pan of FIG. 5.

Drip pan 15 from FIGS. 3 and 4 is shown in greater detail in FIG. 5. The bottom of the pan is formed from base plate 21, having outer perimeter 22. Extending upward and raised from perimeter 22 is exterior, or outer sidewall 23. The outer perimeter is composed of sidewall portions 23a, 23b, 23c, and 23d. Flanges 24a and 24b extend outward from the top edges of outer side pieces 23a and 23b, respectively, to allow drip pan 15 to hang, as shown in FIG. 4 from the opening at the top of body 11. Aperture 26 is formed by edge 27 in the interior of base plate 21. Raised interior, or inner sidewall 28, composed, in this embodiment, of pieces 28a, 28b, 28c, and 28d, extends upward from edge 27. Thus, base plate 21, outer sidewall 23, and inner sidewall 28 form a pan that can hold a cooking liquid, and that has a passage, or channel, 29, formed by aperture 26 and inner sidewall 28, through which infrared radiation can pass. FIG. 6 is a top view of drip pan 15, which more distinctly shows aperture 26 located in the interior of base plate 21.

Figure 7:
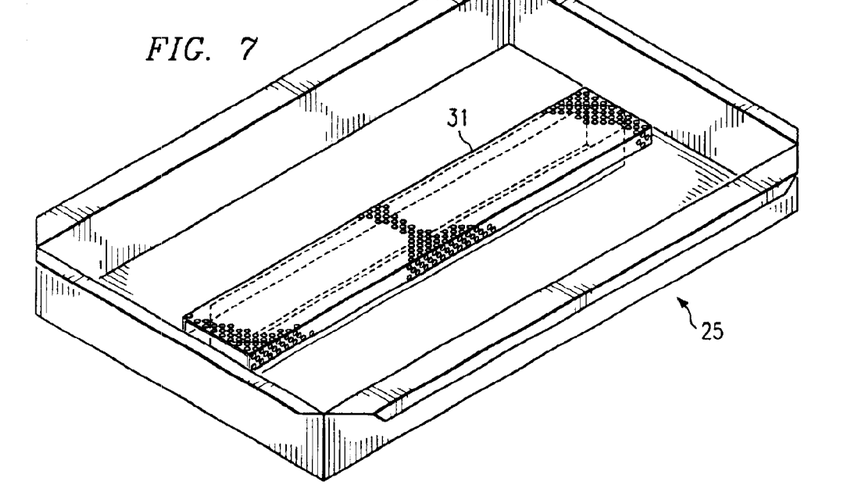
FIG. 7 is an oblique view of another embodiment of the present invention.

FIG. 7 depicts another embodiment of the present invention. Drip pan 25 is similar to drip pan 15 of FIG. 5, with the addition of a perforated metal cover 31, covering the top of passage 29. This cover catches some of the drippings and reduces the amount of drippings falling through passage 29 onto the infrared emitter. The perforations in cover 31, however, allow infrared radiation passing through channel 29 to directly irradiate the food being cooked.

Figures 8, 9:
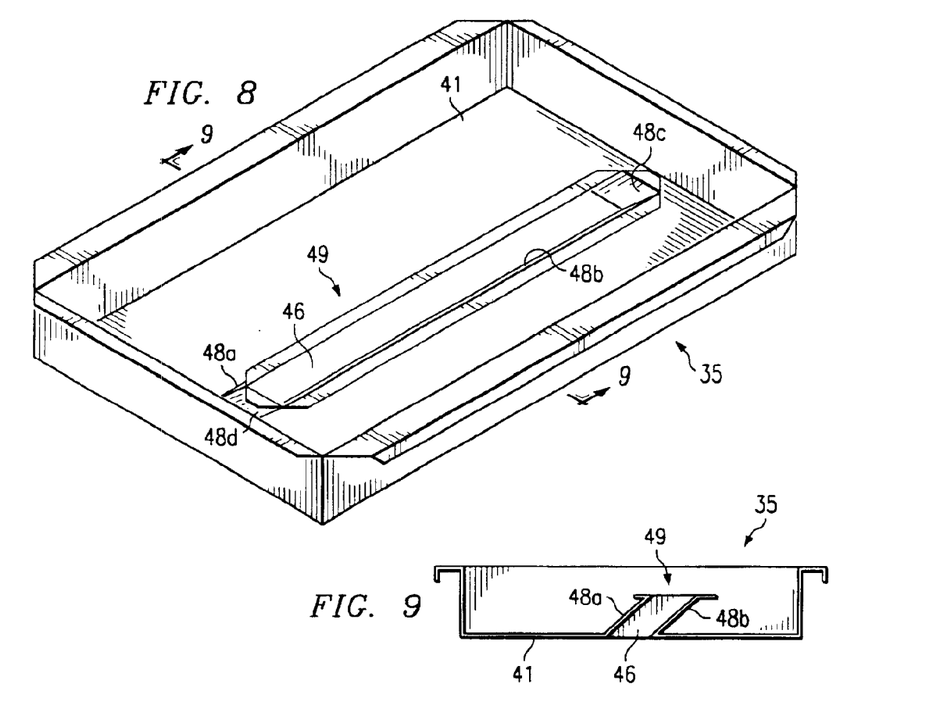
FIG. 8 is an oblique view of an embodiment of the present invention.
FIG. 9 is a cross sectional view of the drip pan of FIG. 8.

Yet another embodiment of the present invention is illustrated in FIG. 8. Drip pan 35 has base plate 41 with aperture 46, similar to drip pans 15 and 25. However, passage 49 is angled from the vertical, in this embodiment. Inner sidewall pieces 48a and 48b are angled, such that inner sidewall piece 48a overhangs aperture 46. In this embodiment, inner sidewall pieces 48c and 48d extend vertically from base plate 41. The positioning of the inner sidewall relative to aperture 46 is more distinctly shown in FIG. 9. Aperture 46 in base plate 41 and inner sidewall pieces 48a and 48b can be seen defining passage 49, which allows infrared radiation from an infrared emitter to pass through the drip pan and directly irradiate the food being cooked. At the same time, however, drippings from the food being cooked falling directly through aperture 46 onto the infrared emitter are minimized by inner sidewall piece 48a, which overhangs aperture 46.

The embodiments of the present invention discussed to this point are all rectangular pans with rectangular apertures, and are shown with four sidewall pieces extending from each. However, drip pans embodying the present invention can be made with any number of sidewall pieces. A circular pan or aperture would have only a single sidewall piece extending from it. A triangular pan or aperture could have three sidewall pieces. Indeed, with any shape drip pan or aperture, a side could be formed from a single side piece, that is, a single strip of material, attached along one long side to the edge of the drip pan or aperture and joined to itself at the ends to form a sidewall.

Figure 10:
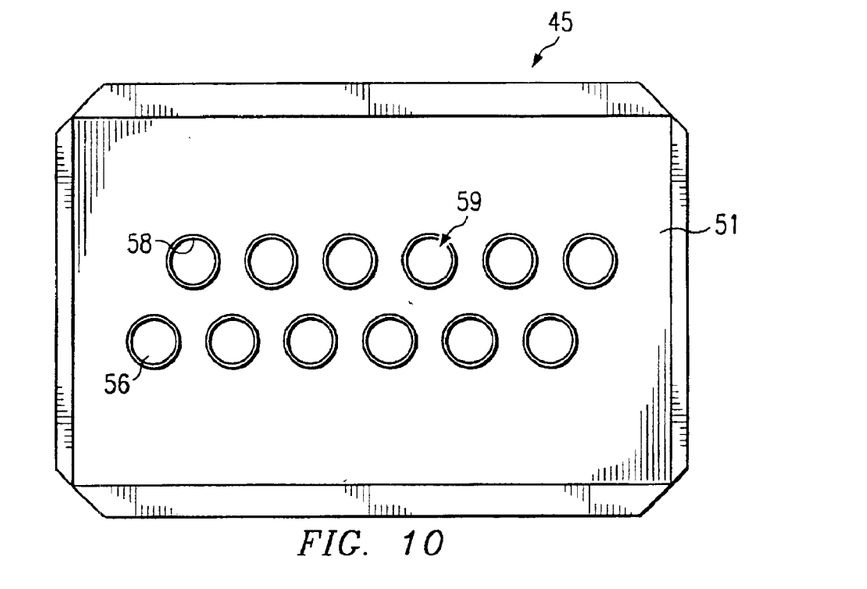
FIG. 10 is a top view of another embodiment of the present invention.
Figure 11:
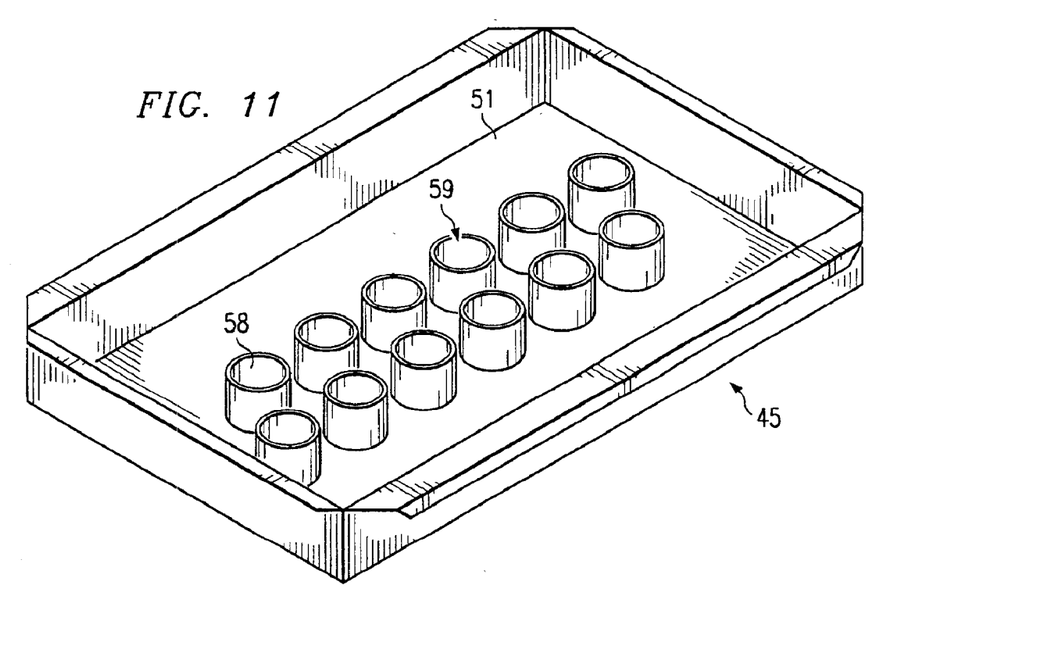
FIG. 11 is an oblique view of the drip pan of FIG. 10.

As an example of this, FIG. 10 shows another embodiment of the present invention. Drip pan 45 has a multitude of circular apertures 56 in base plate 51, each with an inner side 58 attached to its edge, forming a multitude of passages 59. FIG. 11 shows the resulting cylindrical passages 59 more distinctly. A single inner sidewall 58 is attached to each aperture-defining edge of base plate 51 to form the passages 59. The resulting drip pan 45 is capable of holding a cooking liquid, and infrared radiation can pass through apertures 59 to directly irradiate the food being cooked.

Figure 12:
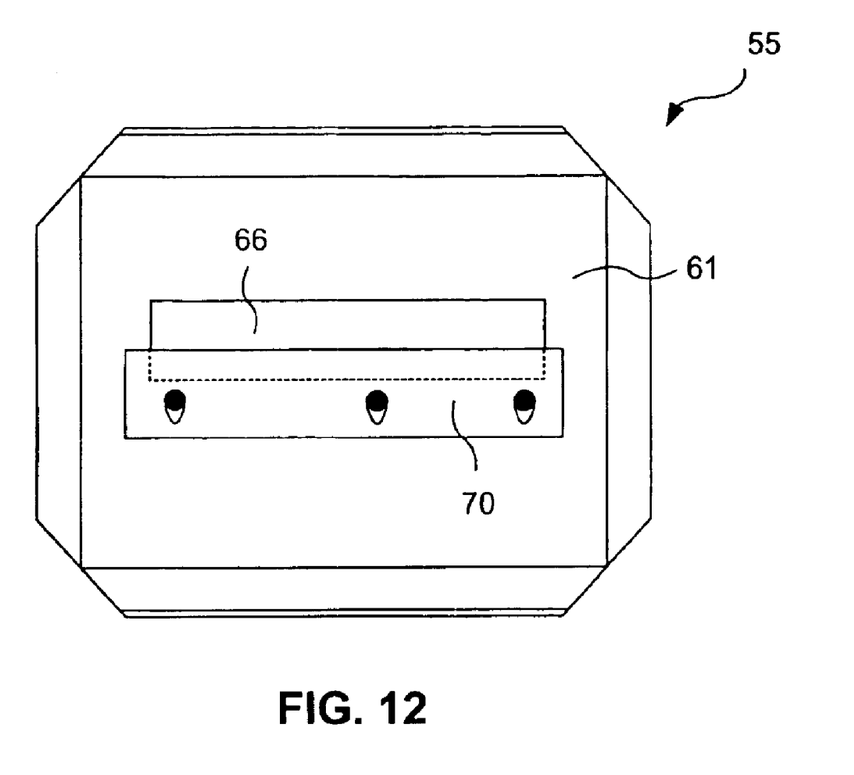
FIG. 12 is a bottom view of an embodiment of the present invention.

FIG. 12 shows another embodiment of the present invention. A sliding plate 70 is mounted to the base plate 61 of drip pan 55. The sliding plate can be adjusted to cover all, part, or none of aperture 66, providing control of the amount of infrared radiation passing through the aperture and irradiating the food being cooked. Alternatively, an adjustable cover can be attached to the top of the channel formed by aperture 66 and the inner sidewall (not shown) rising from the edges of the aperture, to perform the same function.

The embodiments shown herein describe the use of embodiments of the present invention with a cooking apparatus employing an infrared emitter for its heat source. However, it will be understood by those skilled in the art that drip pans according to the present invention may also be used for cooking with other heat sources, for example, wood, charcoal, gas or electricity.

As such, an apparatus, method and system is described for catching juices dripping from food being cooked in an infrared cooking apparatus, while still allowing infrared radiation to directly irradiate the food. In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

What is claimed is:

1. A drip pan for an infrared cooking apparatus, interposed between a cooking location and an infrared emitter, comprising:
   a base plate having an outer perimeter;
   a raised outer sidewall connected to the outer perimeter of the base plate;
   a channel defined by an aperture located in the base plate, the a aperture being defined by an interior edge of the base plate, the interior edge being interior to the outer perimeter, the aperture providing a means for infrared radiation to pass directly from the infrared emitter to the cooking location and the channel being formed by a raised inner sidewall, the inner sidewall connected to the interior edge allowing liquid to be contained in the drip pan.

2. The drip pan of claim 1, further comprising a cover with one or more perforations located thereon, the channel substantially covered by the cover, the perforations allowing infrared radiation to pass directly from the infrared emitter through the perforations to the cooking location.

3. The drip pan of claim 1, wherein the inner sidewall forming the channel is angled such that at least one piece of the inner sidewall overhangs the aperture.

4. The drip pan of claim 1, further comprising a solid cover, the solid cover adjustably mounted to cover the channel, allowing control of the amount of infrared radiation passing through the channel.

5. The drip pan of claim 1, wherein the base plate has more than one aperture, each aperture having an inner sidewall to allow liquid to be contained in the drip pan.

6. A method of using an infrared cooking apparatus with a drip pan, the method comprising the steps of:
   providing a drip pan comprised of;
      a base plate having an outer perimeter and an edge, interior to the outer perimeter, defining an aperture;
      a raised outer sidewall extending from the outer perimeter; and
      a raised inner sidewall extending from the edge, the inner sidewall forming a channel, the pan able to hold a liquid;
   interposing the pan between food and an infrared emitter, so that a portion of infrared radiation passes through the aperture, while the remainder of he infrared radiation is blocked by the pan; and
   placing a liquid in the pan, wherein drippings fall into the liquid.

7. The method of claim 6, further comprises the step of covering the channel with a perforated cover.

8. The method of claim 6, further comprising the step of preventing drippings from falling through the aperture by angling at least one inner sidewall at an angle such that the at least one inner sidewall overhangs the aperture.

9. The method of claim 6, further comprising the step of forming two or more apertures, each aperture defined by a corresponding edge, each edge having at least one corresponding raised interior sidewall extending from the edge, the edges being interior to the outer perimeter.

10. The method of claim 6, further comprising the step of attaching a solid cover to the drip pan, the solid cover adjustably mounted to cover part of the channel, allowing control of the amount of infrared radiation passing through the aperture.

11. A system for cooking food, comprised of:
   an infrared emitter;
   a food support apparatus; and
   a drip pan interposed between the infrared emitter and the food support apparatus, the drip pan comprising;
      a base plate having an outer perimeter;
      a raised outer sidewall connected to the outer perimeter of the base plate;
      a channel interior to the outer perimeter of the base plate, the channel defined by an aperture formed by an edge and a raised inner sidewall connected to the edge, the channel providing a means for infrared radiation to pass from the infrared emitter to the food on the food support apparatus, the raised inner sidewall and the raised outer sidewall allowing a liquid to be contained in the drip pan.

12. The system of claim 11, wherein the drip pan further comprises a perforated cover substantially covering the channel.

13. The system of claim 11, wherein the inner sidewall is angled such that at least one piece of the inner sidewall overhangs the aperture.

14. The system of claim 11, wherein the base has a plurality of channels, each channel formed by a corresponding aperture, each aperture having a corresponding edge, each edge having a corresponding inner sidewall connected to its corresponding edge.

15. The system of claim 11, wherein the drip pan further comprises a solid cover, the solid cover adjustably mounted to cover part of the channel, allowing control of the amount of infrared radiation passing through the channel.

* * * * *